United States Patent [19]
Deki et al.

[11] Patent Number: 4,866,725
[45] Date of Patent: Sep. 12, 1989

[54] METAL VAPOR LASER DEVICE

[75] Inventors: Kyoichi Deki; Shinji Sugioka, both of Kakogawa; Masaki Yoshioka, Izumi; Hiroshige Hata, Himeji, all of Japan

[73] Assignee: Ushio Denki Kabushiki Kaisha, Tokyo, Japan

[21] Appl. No.: 250,512

[22] Filed: Sep. 29, 1988

[30] Foreign Application Priority Data

Mar. 25, 1988 [JP] Japan .......................... 63-38337[U]

[51] Int. Cl.$^4$ .......................... H01S 3/14; H01S 3/03
[52] U.S. Cl. ........................................ 372/56; 372/61
[58] Field of Search .................... 372/56, 29, 33, 61

[56] References Cited

U.S. PATENT DOCUMENTS 4,232,274 11/1980 Tokudome et al. .................. 372/29

OTHER PUBLICATIONS

Dowley, SPIE vol. 741, *Design of Optical Systems Incorporating Low Power Laser*, 1987, pp. 31–38.
Kamide et al, "He-Cd Laser of Long Life and Low Noise", *Laser Research*, vol. 8, No. 2, 1980, pp. 65–72.

*Primary Examiner*—James W. Davie
*Attorney, Agent, or Firm*—Robert F. Ziems

[57] ABSTRACT

A metal vapor laser device which prevents a possible discharge between an electrode and a pressure detector thereof and can generate a laser beam in a stabilized condition. The metal vapor laser device comprises a metal vapor laser tube, a carrier gas supplier, and a pressure detector. The carrier gas supplier communicates with a discharge spacing within the laser tube by way of a communicating hole formed at an end portion thereof. The pressure detector includes a tube defining a pressure detecting chamber therein and communicating with the inside of the carrier gas supplier, and an energizable detecting element provided in the inside of the pressure detecting chamber. A discharge preventing thin tube is provided in the inside of the carrier gas supplier and has an end connected to the end portion of the carrier gas supplier in such a manner as to surround the communicating hole of the carrier gas supplier. The discharge preventing thin tube extends toward the other end portion of the carrier gas supplier farther than a connecting portion of the carrier gas supplier to the pressure detector, and the other end thereof is opened within the carrier gas supplier.

5 Claims, 1 Drawing Sheet

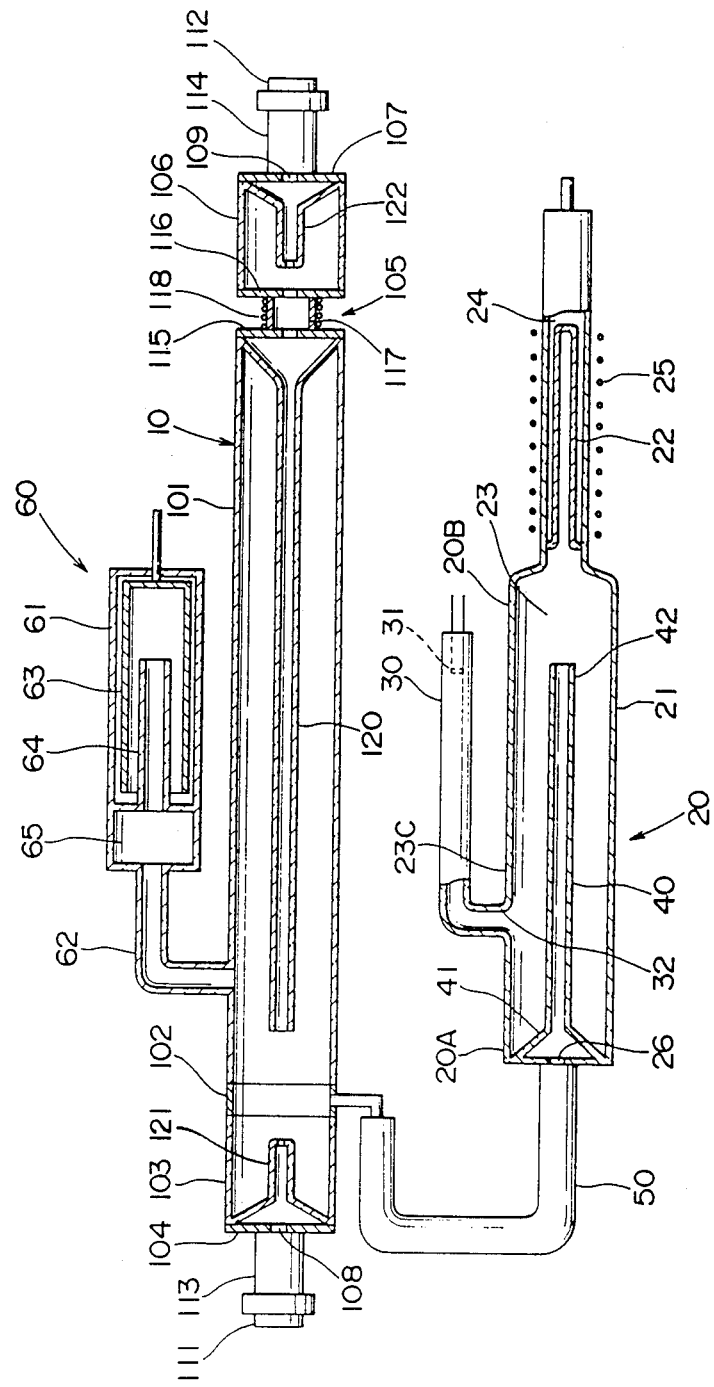

METAL VAPOR LASER DEVICE

BACKGROUND OF THE INVENTION

1. Field of the Invention

This invention relates to a metal vapor laser device.

2. Description of the Prior Art

A metal vapor laser device generates laser oscillations making use of vapor of a working metal which is enclosed in a laser tube together with a carrier gas.

An exemplary one of metal vapor laser devices which are practically used at present is a so-called positive column type metal vapor laser device which generates laser oscillations making use of a positive column portion of a discharge. More particularly, a positive column type He-Cd laser device is known wherein helium is used as a carrier gas and cadmium is used as a working metal.

Such a He-Cd laser device can continuously oscillate, for example, an ultraviolet ray having a wavelength of 325 nm as well as a visible ray having a wavelength of 442 nm in a short wavelength zone. Due to the characteristic, the demand for such He-Cd lasers has increased in recent years, and He-Cd laser devices are used in various fields as light sources, for example, for laser printers, holography, photo-plotters, color scanners and so on.

In such a He-Cd laser device, however, when cadmium vapor is condensed on an inner wall of a laser tube, helium gas is trapped in the condensed cadmium so that the pressure of the helium gas in the laser tube decreases. Consequently, the output laser power of the laser device decreases, which decreases the life of the laser device.

In order to prevent this, a helium gas supplier is conventionally connected to the He-Cd laser tube to supply helium gas suitably into the He-Cd laser tube.

An exemplary one of such conventional helium gas suppliers includes an outer tube substantially impermeable to helium gas, a partition having a helium gas permeability which varies according to temperature and partitioning the inside of the outer tube into a tank section and a reservoir section which communicates with the inside of a laser tube, and a heater for controlling the temperature of the partition. A pressure detector for detecting the pressure of helium gas is connected to the reservoir section of the outer tube of the helium gas supplier. If the pressure detector detects a decrease of the pressure of helium gas, the temperature of the partition is regulated by the heater to control the permeability of the partition to helium gas.

A Pirani sensor which is one of electric detecting means is conventionally empmloyed as such a pressure detector.

Where an electric pressure detector such as a Pirani sensor is used, however, a discharge readily appears between the anode of the He-Cd laser tube and a detecting element of the electric pressure detector to which a voltage is applied because the detecting element of the electric pressure detector is disposed in a spacing which communicates with a spacing within the helium gas supplier. Accordingly, it is a problem that a laser beam is not oscillated stably in the He-Cd laser device.

SUMMARY OF THE INVENTION

It is an object of the present invention to provide a metal vapor laser device which prevents a possible discharge between an electrode and a pressure detector thereof and can generate a laser beam in a stabilized condition.

In order to attain the object, according to the present invention, a metal vapor laser device comprises a metal vapor laser tube, a carrier gas supplier for supplementing carrier gas into the metal vapor laser tube, a pressure detector for electrically detecting the gas of the carrier gas, the carrier gas supplier being connected to the metal vapor laser tube in such a manner as to communicate with a discharge spacing within the metal vapor laser tube by way of a communicating hole formed at an end portion of the carrier gas supplier, the pressure detector including a pressure detecting chamber defining tube which is connected in an branching manner to a side wall of the carrier gas supplier in such a manner as to communicate with the inside of the carrier gas supplier, the presure detector further including an energizable detecting element provided in the inside of a pressure detecting chamber defined by the pressure detecting chamber defining tube, and a discharge preventing thin tube provided in the inside of the carrier gas supplier and having an end connected to the end portion of the carrier gas supplier in such a manner as to surround the communicating hole of the carrier gas supplier, the discharge preventing thin tube extending toward the other end portion of the carrier gas supplier farther than a connecting portion of the carrier gas supplier to the pressure detector, the other end of the discharge preventing thin tube being opened within the carrier gas supplier.

With the metal vapor laser device of the construction described just above, the discharge preventing thin tube is disposed in the specific position described above taking into consideration the positional relationship between the communicating hole of the carrier gas supplier and the connecting portion of the carrier gas supplier to the pressure detecting chamber defining tube of the pressure detector. Accordingly, the creeping distance between the anode of the metal vapor laser tube and the detecting element of the pressure detector is increased due to the presence of the discharge preventing thin tube. Consequently, a possible discharge between the two elements can be checked sufficiently so that a stabilized laser beam can be obtained.

The above and other objects, features and advantages of the present invention will become apparent from the following description and the appended claims, taken in conjunction with the accompanying drawing.

BRIEF DESCRIPTION OF THE DRAWING

The sole FIGURE is a schematic sectional view of a metal vapor laser device showing a preferred embodiment of the present invention.

DESCRIPTION OF THE PREFERRED EMBODIMENT

Referring first to the FIGURE is shown a metal vapor laser device according to a preferred embodiment of the present invention. The metal vapor laser device shown has a structure of the internal resonator type and also of the external cathode type and includes a metal vapor laser tube 10 for oscillating, for example, a He-Cd laser beam, a carrier gas supplier 20, a pressure detector 30 and a cathode container 60.

The metal vapor laser tube 10 is composed of a straight central glass tube 101, an end glass tube 103 connected in an air-tight relationship to an end (left end in the FIGURE) of the central grass tube 101 by way of a connecting metal tube 102, an end metal disk 104 provided in such a manner as to close an opening of the end glass tube 103, another end glass tube 106 connected in an air-tight relationship to the other end (right end in the FIGURE) of the central glass tube 101 by way of a metal tank 105, and another end metal disk 107 provided in such a manner as to close an opening at the outer end of the end glass tube 106 and serving as an anode. Each of the end metal disks 104 and 107 has a through-hole 108 or 109 perforated at the center thereof and has a mirror holding tube 113 or 114 secured thereto, respectively. A mirror 111 or 112 which constitutes a resonator is secured to each of the mirror holding tubes 113 and 114, respectively.

Meanwhile, the metal tank 105 is composed of a metal disk 115 provided at the other end (right end in the FIGURE) of the central glass tube 101, another metal disk 116 provided at an inner end of the end glass tube 106, and a metal tube 117 of a smaller diameter interconnecting the two disks 115 and 116. A heater 118 is provided on an outer periphery of the metal tube 117 while a working metal such as, for example, cadmium metal is disposed within the metal tube 117.

A thin glass tube 120 is disposed in the central glass tube 101. The thin glass tube 120 is connected at an end thereof to the end of the central glass tube 101 adjacent the metal tank 105 and extends along an axis of the central glass tube 101. A pair of discharge path controlling glass tubes 121 and 122 are disposed in the end glass tubes 103 and 106, respectively. The discharge path controlling glass tubes 121 and 122 are connected to outer ends of the end glass tubes 103 and 106 and extend along axes of the end glass tubes 103 and 106, respectively.

The cathode container 60 is composed of a glass tube 61 one end of which is connected, by way of a connecting tube 62, to a portion of a circumferential wall of the central glass tube 101 near the connecting metal tube 102. A cathode 63 made of, for example, tubular aluminum is disposed in the glass tube 61. The cathode 63 is closed at an outer end (right end in the FIGURE) thereof. A discharge controlling thin glass tube 64 is formed on an inner face of the circumferential wall of the glass tube 61 and extends into the cathode 63. A metal vapor trap 65 is defined in the glass tube 61 between the connecting tube 62 and the discharge controlling thin glass tube 64.

The carrier gas supplier 20 is connected to the metal vapor laser tube 10 at the connecting metal tube 102 of the latter by means of a connecting tube 50. The carrier gas supplier 20 includes an outer tube 21 substantially impermeable to the carrier gas, and an inner tube 22 made of a material having a permeability to the carrier gas which varies according to temperature and provided in a coaxial relationship within a small diameter portion of the outer tube 21 such that it partitions the inside of the outer tube 21 into a reservoir section 23 and a tank section 24. The carrier gas supplier 20 further includes a heater 25 provided on an outer periphery of the smaller diameter section of the outer tube 21 for controlling the permeability of the inner tube 22 to the carrier gas.

The carrier gas supplier 20 has an end portion 20A in which a communicating hole 26 is perforated. The carrier gas supplier 20 communicates with the inner discharge spacing of the metal vapor laser tube 10 by way of the communicating hole 26 therein and the connecting tube 50. Accordingly, the pressure of the carrier gas within the reservoir section 23 of the carrier gas supplier 20 is normally maintained substantially the same as the pressure of the carrier gas within the discharge spacing of the metal vapor laser tube 10.

The pressure detector 30 includes a pressure detecting chamber defining tube made of glass and defining a pressure detecting chamber therein. The pressure detecting chamber defining tube of the pressure detector 30 is connected in a branching manner to a circumferential wall 23C of the reservoir section 23 of the carrier gas supplier 20. The pressure detector 30 further includes a detecting element 31 disposed in the pressure detecting chamber in the pressure detecting chamber defining tube thereof for electrically detecting the magnitude of the pressure within the pressure detecting chamber. The detecting element 31 may be, for example, a filament which constitutes a Pirani gauge.

A discharge preventing thin or capillary tube 40 is connected at an end 41 thereof to the end portion 20A of the carrier gas supplier 20 in such a manner as to surround the communicating hole 26 in the end portion 20A of the carrier gas supplier 20. The other end 42 of the discharge preventing thin tube 40 extends toward the other end portion 20B of the carrier gas supplier 20 farther than the connecting portion 32 of the pressure detector 30 to the carrier gas supplier 20 such that it may communicate with the inside of the reservoir section 23 of the carrier gas supplier 20.

Since helium gas is used as a carrier gas in the present embodiment, such a material as, for example, quartz glass can be used as a material of the inner tube 22. Especially, quartz glass is superior in temperature dependency of the helium gas permeability so that a supplement of helium gas can be achieved rapidly. Helium gas is thus filled in the tank section 24 of the carrier gas supplier 20 normally at the pressure of 100 to 200 Torr or so, and the pressure of helium gas within the reservoir section 23 is maintained constant normally within a range from 5 to 6 Torr or so. The outer tube 21 of the carrier gas supplier 20 may be formed from such a material as, for example, hard glass. Meanwhile, such a material as, for example hard glass may be used for the discharge preventing thin tube 40.

The heater 25 is formed from a resistance wire such as, for example, a nichrome wire and is controlled in response to a signal indicative of a pressure of the carrier gas within the reservoir section 23 of the carrier gas supplier 20 detected by the pressure detector 30 to generate heat so that the pressure of the carrier gas within the reservoir section 23 may remain at a predetermined constant value. As a result, the pressure of the carrier gas within the metal vapor laser tube 10 which communicates with the inside of the reservoir section 23 of the carrier gas supplier 20 by way of the connecting tube 50 is maintained constant. In this instance, since the reservoir section 23 functions as a buffer, a sudden change of the pressure of the carrier gas within the metal vapor laser tube 10 is prevented, which eliminates a possible bad influence on oscillations of a laser beam by the metal vapor laser tube 10.

With the metal vapor laser device having such a construction as described above, a discharge appears between the cathode 63 and the anode provided by the end metal disk 107 via the thin glass tube 120 so that light of a particular wavelength is oscillated as a laser beam by the mirrors 111 and 112 which constitute a resonator.

With the metal vapor laser device of the embodiment described above, the discharge preventing thin tube 40 is disposed such that the end 41 thereof is connected to the end portion 20A of the carrier gas supplier 20 in such a manner as to surround the communicating hole 26 in the inside of the carrier gas supplier 20 while the other end 42 thereof extends toward the other end portion 20B of the carrier gas supplier 20 farther than the connecting portion 32 of the carrier gas supplier 20 to the pressure detector 30. Accordingly, the end disk 107 of the metal vapor laser tube 10 serving as an anode and the energizable detecting element 31 of the pressure detector 30 can be disposed in a spaced relationship by a sufficiently great creeping distance to prevent occurrence of a discharge between the anode 107 and the detecting element 31. Consequently, a stabilized laser beam can be generated by the metal vapor laser device.

Further, with the metal vapor laser device of the embodiment described above, the metal vapor laser tube 10 is simple in construction and easy to produce because it is composed of the central glass tube 101, connecting metal tube 102, end glass tubes 103 and 106, end metal disks 104 and 107 and metal tank 105. The glass tubes here are preferably made of covar glass and the metal tube and the metal disks are preferably made of covar metal.

In addition, a sufficient distance can be assured between the connecting tube 50 for interconnecting the carrier gas supplier 20 and the metal vapor laser tube 10 and the end metal disk 107 serving as an anode because the connecting tube 50 is connected to the metal vapor laser tube 10 at a location of the metal vapor laser tube 10 near the other end metal disk 104 which does not serve as an anode.

While the present invention has been described hereinabove in connection with a preferred embodiment thereof, detailed construction of a metal vapor laser tube is not limited to the specific one of the embodiment, and various alterations and modifications may be made to the same.

Besides, the working metal to be enclosed in the metal vapor laser tube is not limited to cadmium and may be any other suitable metal, and the carrier gas to be used in combination with the metal is not limited to helium gas and may be any other suitable gas.

What is claimed is:

1. In a metal vapor laser including a metal vapor laser tube for oscillating a laser beam, a carrier gas supplier for supplementing carrier gas into said metal vapor laser tube, and a pressure detector for electrically detecting the pressure of the carrier gas, the improvement comprising: said carrier gas supplier being connected to said metal vapor laser tube in such a manner as to communicate with a discharge spacing within said metal vapor laser tube by way to a side wall of said carrier gas supplier in such a manner as to communicate with the inside of said carrier gas supplier, said pressure detector further including an energizable detecting element provided in the inside of a pressure detecting chamber defined by said pressure detecting chamber defining tube, and a discharge preventing capillary tube provided in the inside of said carrier gas supplier and having an end connected to the end portion of said carrier gas supplier in such a manner as to surround said communicating hole of said carrier gas supplier, said discharge preventing capillary tube extending toward the other end portion of said carrier gas supplier farther than a connecting portion of said carrier gas supplier to said pressure detector, the other end of said discharge preventing capillary tube being opened within said carrier gas supplier.

2. A metal vapor laser device as claimed in claim 1, wherein said detecting element of said pressure detector is a filament which constitutes a Pirani gauge.

3. A metal vapor laser device as claimed in claim 1, wherein said metal vapor laser tube includes a glass tube, a metal tube and a pair of end metal disks, and a mirror which constitutes a resonator is provided one each of said end metal disks.

4. A metal vapor laser device as claimed in claim 3, wherein one of said end metal disks of said metal vapor laser tube serves as an anode, and a connecting tube for connecting said carrier gas supplier to said metal vapor laser tube is connected to said metal vapor laser tube at a location near the other one of said end metal disks which does not serve as an anode.

5. A metal vapor laser device as claimed in claim 1, wherein the carrier gas is helium gas and the working metal is cadmium.

* * * * *

UNITED STATES PATENT AND TRADEMARK OFFICE
CERTIFICATE OF CORRECTION

PATENT NO. : 4,866,725
DATED : September 12, 1989
INVENTOR(S) : Kyoichi Deki et al It is certified that error appears in the above-identified patent and that said Letters Patent is hereby corrected as shown below:

Column 6, line 2, after "laser" (first occurrence),
    insert --device--;
        line 10, after "way", insert --of a communicating hole formed at an end portion of said carrier gas supplier, said pressure detector including a pressure detecting chamber defining tube which is connected--.

Signed and Sealed this

Fourth Day of September, 1990

Attest:

HARRY F. MANBECK, JR.

*Attesting Officer*  *Commissioner of Patents and Trademarks*